(No Model.)

E. BURTON.
CHILD'S CARRIAGE.

No. 247,162. Patented Sept. 20, 1881.

WITNESSES:
G. H. Romell
Geo Smith

INVENTOR:
Elmer Burton
Per E. C. Frink
his Attorney

UNITED STATES PATENT OFFICE.

ELMER BURTON, OF RAYSVILLE, INDIANA.

CHILD'S CARRIAGE.

SPECIFICATION forming part of Letters Patent No. 247,162, dated September 20, 1881.

Application filed July 5, 1881. (No model.)

*To all whom it may concern:*

Be it known that I, ELMER BURTON, a citizen of the United States, residing at Raysville, in the county of Henry and State of Indiana, have invented a new and useful Improvement in Children's Carriages, of which the following is a specification.

My invention relates to improvements in children's carriages, in which a spring and its operating mechanism operate in conjunction with a lever and a crank on the hind axle; and the object of my invention is to provide a child's carriage with a device for moving it forward and backward in a continuous manner. This object I accomplish by the mechanism illustrated in the accompanying drawings, in which—

Figure 1:
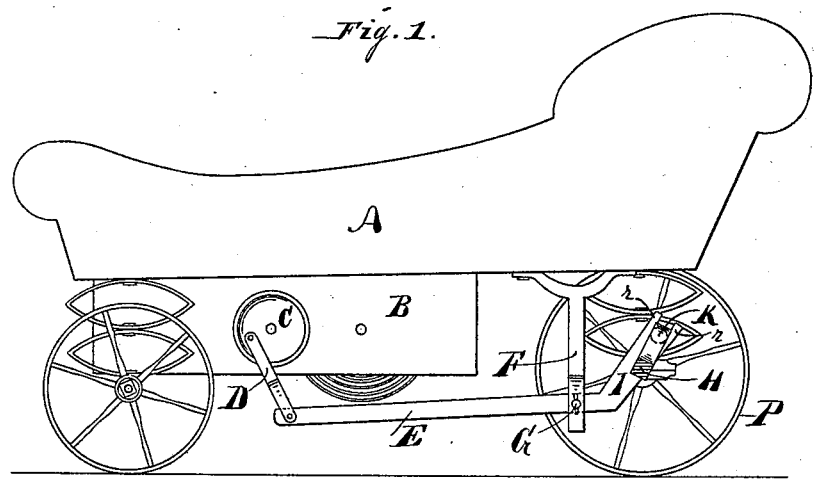
Figure 2:
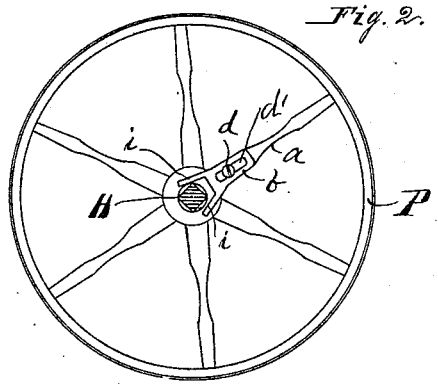

Figure 1 represents a side view of a child's carriage embodying my improvement; and Fig. 2 is a view of one of the hind wheels, showing the manner in which the wheel is secured to or loosened from the crank-axle.

Similar letters in the different views refer to like parts.

A represents the bed of the carriage mounted on wheels. The rear axle, H, is provided with a crank, K, in its center, and the ends of the axle, where the hubs of the wheels P operate, are round spindles for the wheels to revolve on. Outside of the spindles of the rear axle one end of the axle is squared up, as shown at H, Fig. 2, and one of the spokes of the wheel, as at a, is provided with an adjustable dog, b, with binding-screw d in the adjusting-slot d'. One end of the dog b is provided with a recess, which is formed between the jaws i i, for the purpose of clamping the wheel P to the axle X. Thus, when it is desired to make the wheel P fast to the axle and rotate with it, the dog b is adjusted so that the square part of the end of the axle H is in the recess between the jaws i i, and the dog b is made fast by the screw d.

The clock mechanism contained in the case B may be of any ordinary kind, the driving-shaft of which is provided on the outside of the case B with a crank-wheel, C. The pitman D connects the crank-wheel C with the front end of the lever E. Said lever E is pivoted to the standard F, at G, in a detachable manner. The inclined end I of the lever E is provided at its end with a slot formed between the jaws r r, which straddle the crank K.

The clock mechanism being wound up and the wheel P secured to the axle H by the dog b, as before described, the operation is as follows: The crank C and pitman D move the front end of the lever E up and down as the crank C revolves, and the inclined arm I of the lever, which straddles the crank K, as it is oscillated on the pivot G causes the crank K to vibrate forward and backward, thus communicating a forward and backward rotating motion to the wheel P, which causes the carriage to move forward and backward.

When it is desired to use the carriage for other purposes the dog b is loosened and detached from the axle H. The lever E I holds the axle from turning, and the hind wheels, P, are free to turn on their spindles.

What I claim as new, and desire to secure by Letters Patent, is—

1. In combination with a child's carriage, the clock mechanism B with crank C, combined with the pitman D, the lever E I, and crank K on the rear axle, H, substantially as specified.

2. The wheel P, with adjustable dog b, combined with the axle H, said axle having a round spindle for the wheel to operate on and a square part for the dog to be made fast to, substantially as specified.

In testimony whereof I have signed my name to this specification in the presence of two subscribing witnesses.

ELMER BURTON.

Witnesses:
 E. O. FRINK,
 SIMON HEATTICO.